(12) United States Patent
Krishnamurthy

(10) Patent No.: US 8,768,961 B2
(45) Date of Patent: Jul. 1, 2014

(54) SYSTEM AND METHOD OF PROCESSING DATABASE QUERIES

(75) Inventor: Balachander Krishnamurthy, New York, NY (US)

(73) Assignee: AT&T Labs, Inc., Austin, TX (US)

( * ) Notice: Subject to any disclaimer, the term of this patent is extended or adjusted under 35 U.S.C. 154(b) by 1121 days.

(21) Appl. No.: 11/863,963

(22) Filed: Sep. 28, 2007

(65) Prior Publication Data

US 2008/0222134 A1 Sep. 11, 2008

Related U.S. Application Data

(60) Provisional application No. 60/893,948, filed on Mar. 9, 2007.

(51) Int. Cl.
*G06F 7/00* (2006.01)
*G06F 17/30* (2006.01)

(52) U.S. Cl.
USPC .............................. 707/781; 707/788; 707/919

(58) Field of Classification Search
USPC ............ 707/781, 999.001–999.005, 788, 919
See application file for complete search history.

(56) References Cited

U.S. PATENT DOCUMENTS

| | | | |
|---|---|---|---|
| 5,535,431 A | 7/1996 | Grube et al. | |
| 5,706,435 A * | 1/1998 | Barbara et al. | 707/999.201 |
| 6,154,172 A | 11/2000 | Piccionelli et al. | |
| 6,459,782 B1 * | 10/2002 | Bedrosian et al. | 379/201.08 |
| 6,523,023 B1 * | 2/2003 | Sonnenberg | 707/999.003 |
| 6,665,715 B1 | 12/2003 | Houri | |
| 6,731,612 B1 | 5/2004 | Koss | |
| 7,062,572 B1 | 6/2006 | Hampton | |
| 7,072,963 B2 | 7/2006 | Anderson et al. | |
| 7,200,658 B2 | 4/2007 | Goeller et al. | |
| 7,321,863 B2 * | 1/2008 | Hartmann et al. | 705/5 |
| 7,634,465 B2 * | 12/2009 | Sareen et al. | 707/999.003 |
| 7,792,297 B1 * | 9/2010 | Piccionelli et al. | 380/258 |
| 2003/0061282 A1 | 3/2003 | Ebata et al. | |
| 2004/0158528 A1 * | 8/2004 | Zuili | 705/52 |
| 2004/0242332 A1 * | 12/2004 | Walker et al. | 463/42 |
| 2005/0021853 A1 * | 1/2005 | Parekh et al. | 709/245 |
| 2005/0086299 A1 * | 4/2005 | Ansell et al. | 709/203 |
| 2005/0108213 A1 * | 5/2005 | Riise et al. | 707/3 |
| 2005/0108244 A1 | 5/2005 | Riise et al. | |
| 2005/0220288 A1 * | 10/2005 | Huey | 379/265.02 |
| 2005/0256866 A1 * | 11/2005 | Lu et al. | 707/5 |
| 2006/0036748 A1 * | 2/2006 | Nusbaum et al. | 707/3 |
| 2006/0167842 A1 * | 7/2006 | Watson | 707/3 |
| 2006/0271280 A1 * | 11/2006 | O'Clair | 701/208 |
| 2006/0282412 A1 * | 12/2006 | Getchius | 707/3 |
| 2007/0022005 A1 * | 1/2007 | Hanna | 705/14 |
| 2007/0033650 A1 * | 2/2007 | Grosse et al. | 726/22 |
| 2007/0067297 A1 * | 3/2007 | Kublickis | 707/9 |
| 2007/0078848 A1 * | 4/2007 | Sareen et al. | 707/5 |
| 2007/0130370 A1 * | 6/2007 | Akaezuwa | 710/1 |
| 2007/0162424 A1 * | 7/2007 | Jeh et al. | 707/2 |
| 2007/0186282 A1 * | 8/2007 | Jenkins | 726/22 |
| 2008/0005074 A1 * | 1/2008 | Flake et al. | 707/3 |
| 2008/0046450 A1 * | 2/2008 | Marshall | 707/100 |

\* cited by examiner

Primary Examiner — Kannan Shanmugasundaram
(74) Attorney, Agent, or Firm — Toler Law Group, PC

(57) ABSTRACT

Systems and methods of processing database search queries are provided. A method of processing database search queries includes receiving a database query from a query source. The method also includes determining location information associated with the query source based at least partially on an Internet Protocol (IP) address associated with the database query. The method further includes determining, based at least partially on the location information, whether the query source satisfies a required source attribute. The method also includes withholding information requested by the database query when the required source attribute is not satisfied.

16 Claims, 7 Drawing Sheets

SYSTEM AND METHOD OF PROCESSING DATABASE QUERIES

CROSS-REFERENCE TO RELATED APPLICATIONS

The present application claims priority from U.S. Provisional Patent Application No. 60/893,948, filed Mar. 9, 2007, entitled "SYSTEM AND METHOD OF PROCESSING DATABASE QUERIES," naming inventor Balachander Krishnamurthy, which application is incorporated by reference herein in its entirety.

FIELD OF THE DISCLOSURE

The present disclosure is generally related to processing database queries.

BACKGROUND

The Internet can provide a source of revenue for many businesses. However, the Internet can also pose risks as dishonest individuals exploit security vulnerabilities. These attackers can be difficult to identify, because they may co-opt other computers using software robot applications. As attackers generate networks of co-opted machines ("botnets"), they can do greater damage. For example, a botnet may be used to replicate a proprietary database by continuously submitting search queries to a search engine communicating with the proprietary database and by recording all search results returned by the search engine interface.

Businesses that operate such proprietary databases may wish to distinguish legitimate users from non-legitimate users. Nonetheless, previous techniques often present inconvenience to legitimate users, particularly for public search engines (i.e., those with no user name or password requirement). Further, techniques such as blacklisting may become impractical as the number of users increases. Hence, there is a need for an improved system and method of processing database search queries.

DETAILED DESCRIPTION OF THE DRAWINGS

Figure 1:
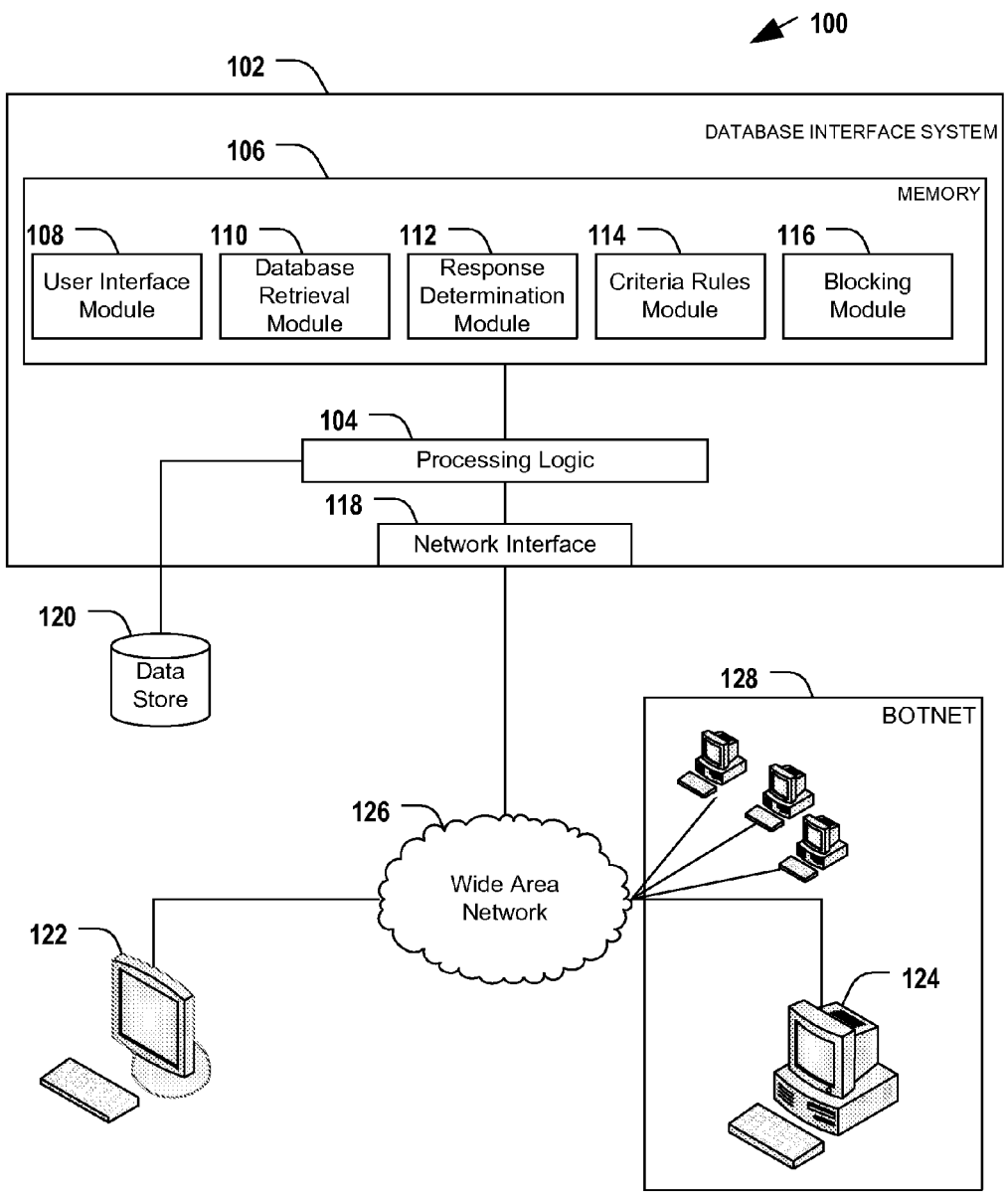
FIG. 1 is a block diagram of a particular embodiment of a system to process database queries.

A method of processing database queries is disclosed that includes receiving a database query from a query source. The method also includes determining location information associated with the query source based at least partially on an Internet Protocol (IP) address associated with the database query. The method further includes determining, based at least partially on the location information, whether the query source satisfies a required source attribute. The method also includes withholding information requested by the database query when the required source attribute is not satisfied.

In another embodiment, a method of processing database queries is disclosed that includes receiving a database query from a query source and determining at least one attribute associated with the query source based at least partially upon an Internet Protocol (IP) address associated with the database query and information controlled at a first network element independent from the query source. The method also includes determining whether the query source satisfies a required source attribute based on the at least one attribute associated with the query source. The method further includes withholding information requested by the database query when the required source attribute is not satisfied.

In another particular embodiment a system to process database queries is disclosed that includes a database interface system having processing logic and memory accessible to the processing logic. The memory includes an interface module executable by the processing logic to provide an interface to receive a database query from a query source via a wide area network. The memory also includes a response determination module executable by the processing logic to determine whether the query source satisfies a required source attribute based at least partially on at least one attribute associated with the database query. The response determination module is also executable by the processing logic to inhibit the database interface system from sending information requested by the database query when the query source does not satisfy the required source attribute.

In another embodiment, a processor-readable medium is disclosed that includes instructions executable by a processor to perform a method including receiving a database query from a query source and determining location information associated with the query source based at least partially on an Internet Protocol (IP) address associated with the database query. The method further includes determining, based at least partially on the location information, whether the query source satisfies a required source attribute. The method also includes withholding information requested by the database query when the required source attribute is not satisfied.

In another embodiment, a processor-readable medium is disclosed that includes instructions executable by a processor to perform a method including receiving a database query from a query source and determining at least one attribute associated with the query source based at least partially upon an Internet Protocol (IP) address associated with the database query and information controlled at a network element independent from the query source. The method also includes determining whether the query source satisfies a required source attribute based on the at least one attribute associated with the query source. The method further includes withholding information requested by the database query when the required source attribute is not satisfied.

Referring to FIG. 1, a particular embodiment of a system to process database search queries is illustrated and generally designated 100. The system 100 includes a database interface system 102 that communicates with computing devices, such as user computers 122 and 124, via a wide area network 126. The database interface system 102 can include a web server or a system of servers or other devices that independently or redundantly provide one or more functions related to processing database search queries. In an illustrative embodiment, the database interface system 102 can include a network interface 118 to facilitate communication between the database interface system 102 and the wide area network 126.

In a particular embodiment, the database interface system 102 can include processing logic 104, such as one or more processors, and memory 106 accessible to the processing logic 104. The memory 106 can include one or more modules 108-116, each adapted to implement one or more functions of the database interface system 102. The modules 108-116 can include, for example, instructions executable by the processing logic 104, such as instructions included in one or more software applications or other computer programs. In an alternative embodiment, the modules 108-116 can include hardware logic, executable instructions, or any combination thereof. The memory 106 can include a single memory device or distributed memory resources.

In a particular embodiment, the memory 106 can include a user interface module 108 that is executable by the processing logic 104 to provide a database search interface via a website accessible via the wide area network 126. For instance, the user interface module 108 can be executable by the processing logic 104 to provide an Internet search engine, a business or residential search website (e.g., a white pages or yellow pages search site), or another interface to search data records stored at a data store 120. In addition, the user interface module 108 can be executable by the processing logic 104 to receive a database search query from a query source, such as the user computer 122, via the user interface. The memory 106 can include a database retrieval module 110 that is executable by the processing logic 104 to retrieve data records related to the database search query from the data store 120.

In a particular embodiment, the memory 106 can include a response determination module 112 that is executable by the processing logic 104 to determine whether to provide the retrieved database information, such as search results, via the user interface in response to a database search query based on attributes of the database search query, the query source, or any combination thereof. For example, the response determination module 112 can be executable by the processing logic 104 to determine that search results are not to be sent to a query source when the database interface system 102 determines that the query source may be attempting to copy the contents of the data store 120, disrupt the contents of the data store 120, or disrupt the operation of the database interface system 102. For example, an attacker may utilize a computer, such as the user computer 124, to control other computers in a botnet 128 to replicate the contents of the data store 120 by sending multiple database queries.

In another illustrative embodiment, the response determination module 112 can be executable by the processing logic 104 to identify a query source and to determine one or more required attributes of a database search query based at least partially on one or more attributes of the query source. For instance, the response determination module 112 can be executable by the processing logic 104 to identify a party registered with an Internet connection from which a database query source is received (e.g., based on Internet Protocol address records) and to determine that the database search query relates to a subject matter in which the party would likely be interested.

In an illustrative embodiment, the response determination module 112 can be executable by the processing logic 104 to determine one or more source attributes associated with a query source based on information related to a database query received from the query source. In a particular embodiment, the one or more source attributes can be related to immutable properties of the query source (e.g., an immutable property of an Internet Protocol (IP) address) or other attributes that are not easily masked or simulated by an attacker.

For example, the response determination module 112 can be executable by the processing logic 104 to identify a physical attribute as the source attribute, such as a geographical location related to the database search query. To illustrate, the query may seek information regarding dentists in Austin, Tex. The source attribute may satisfy a required source attribute when it indicates that the query source is within a specified distance of the geographical location (e.g., within 50 miles of Austin, Tex.), within a specified area associated with the geographic region (e.g., within the same state), at a required latitude or required longitude, within a required range of latitudes and required range of longitudes, within a specified time zone, or otherwise within another specified geographical vicinity.

In another example, a source attribute determined based on an IP address associated with a database query may include a network location attribute. The network location attribute may be related to a physical topology of the network (e.g., physical connections between network elements) or a logical topology of the network (e.g., logical connections between network elements). In an illustrative embodiment, the network location attribute may be determined by probing the network using one or more probe commands, such as a ping command or a traceroute command. The network location attribute may be associated with the query source, a network element independent of the query source, or any combination thereof. To illustrate, a ping response or hop count associated with the query source, or a network element associated with but independent of the query source (e.g., such as a server at an ISP associated with the query source) may be used to determine the network location attribute. Other examples of data that may be used to determine the network location attribute include information identifying an ISP of the query source, bandwidth available to the query source, or an upstream link associated with the query source.

In another example, a source attribute determined based on an IP address associated with a database query may include an allocation-level attribute. Allocation-level attributes may include information associated with an administrative entity to which the IP address is assigned (e.g., a company, university, Internet Service Provider (ISP), another entity, or any combination thereof, that administers the IP address), information associated with a prefix length at which the IP address is allocated, a Domain Name System (DNS) name associated with the IP address, information associated with an authoritative DNS server associated with the IP address, other allocation level attributes, or any combination thereof.

In another example, a source attribute determined based on an IP address associated with a database query may include an application-level attribute. Application-level attributes may include information associated with an operating system, hardware environment, software environment, user agent of the query source.

If a query source or database search query does not satisfy the required attribute(s), the response determination module 112 can be executable by the processing logic 104 to prevent information requested by the database query (e.g., search results relating to the database search query) from being sent to the query source via the user interface. In a particular embodiment, the database interface system may be adapted to authorize a second network device, such as a data server (not shown), to respond to the database query. In this embodiment, the response determination module 112 may be executable by the processing logic to inhibit the second network device from sending the information requested by the database query. For example, the response determination module 112 may withhold (i.e., not provide) an authorization to the second network device to send the information. In another example, the response determination module 112 may add the query source to a list of blocked sources thereby preventing the second network element from sending a response to the query source now and in the future.

In a particular embodiment, the memory 106 can include a criteria rules module 114 that is executable by the processor 104 to determine and store rules for determining required attributes, secondary criteria, other criteria, or any combination thereof. In an illustrative, non-limiting embodiment, the criteria rules module 114 can be executable by the processor 104 to derive the rules by analyzing and correlating attributes of trusted query sources, such as individuals known to be using a search engine for legitimate purposes, with attributes of database search queries received from such trusted query sources. The response determination module 112 can be executable by the processing logic 104 to access criteria rules stored at the criteria rules module 114 and to determine the required query source attribute(s) and other criteria for providing search results to a query source based at least partially on the rules stored at the criteria rules module 114, as they relate to a particular database search query, a particular query source, or any combination thereof.

In an illustrative embodiment, it can be determined that for a particular type of database query, trusted query sources are typically located in geographic areas related to the query. For example, database queries seeking contact information (e.g., location, address, telephone number, etc.) of certain businesses, such as one-hour film developers, may be legitimately sent by users who are near these businesses. However, users who send such queries from half way around the world may be suspect. Therefore, query sources within a geographic area related to the query may be trusted query sources. This correlation can be used to derive a rule that a query source must be associated within a geographic vicinity to receive certain database information, such as database information related to certain businesses. The response determination module 112 can be executable by the processing logic 104 to access this rule and to determine that a query source must be within a certain vicinity to perform certain queries. For example, a rule may indicated that to receive contact information for one-hour photograph developers in Miami, Fla., the query source must be within 20 miles of Miami. If the query source is located in Idaho, for instance, the response determination module 112 can be executable by the processing logic 104 to prevent search results from being sent to the query source.

In another example, it can be determined that database queries received from trusted query sources typically relate to businesses in which a user of the query source is likely to be interested. This correlation can be used to derive a rule that a database query must relate to a subject matter in which a party associated with a specific Internet connection would likely be interested. For example, if a database search query received from an Internet connection registered to an elderly man who lives alone is related to doctors specializing in obstetrics, for instance, the response determination module 112 can be executable by the processing logic 104 to prevent search results from being sent to the query source.

In an illustrative embodiment, the response determination module 112 can be executable by the processing logic 104 to determine additional criteria for search results to be sent to a query source, or to retrieve such additional criteria from the criteria rules module 114. For example, the response determination module 112 can be executable by the processing logic 104 to require that a number of database queries received from a query source be less than a threshold number over a particular time span (e.g., one or more hours, a day, week, month, year, etc.), even if a geographical vicinity or other attribute of the query source or the database search queries received therefrom satisfy required attributes determined by the database interface system 102. In another example, the response determination module 112 can be executable by the processing logic 104 to require that a daily number of database queries received from a query source be less than a threshold number, and the threshold number may be smaller for query sources that are more distant from the subject of the query (e.g., the business to which the query relates). In another example, the response determination module 112 can be executable by the processing logic 104 to require that a certain number of consecutive searches not be substantially in alphabetical order, even if attributes of the query source or the database search queries received therefrom satisfy required attributes determined by the database interface system 102.

In another illustrative embodiment, the response determination module 112 can be executable by the processing logic 104 to allow a query source that does not satisfy required source attributes to receive search results if secondary criteria are satisfied, such as if a pre-defined number of throughput commands are received with respect to prior search results. For instance, a business traveler from Chicago can be searching for restaurants to visit on a trip to Washington, D.C., and a first plurality of search results can be returned. If a pre-defined number of click-through commands are received with respect to the first search results (indicating that the query source is examining the restaurants, rather than just obtaining the search results), search results can be returned in response to additional database search queries received from the query source, even though the query source may not satisfy a required attribute, such as geographical vicinity.

In another illustrative embodiment, the response determination module 112 can be executable by the processing logic 104 to prevent search results from being sent to a query source based on multiple additional criteria. For example, if no throughput commands are received after a number of consecutive searches, the response determination module 112 can be executable by the processing logic 104 to prevent search results from being sent to the query source, even if the query source satisfies a primary criterion, such as geographical vicinity.

In a particular embodiment, the memory 106 can include a blocking module 116 that is executable by the processing logic 104 to log identification data related to query sources to which search results are not sent and to block future communication between the database interface system 102 and the query sources without regard to attributes of database search queries received from the blocked query sources.

Figure 2:
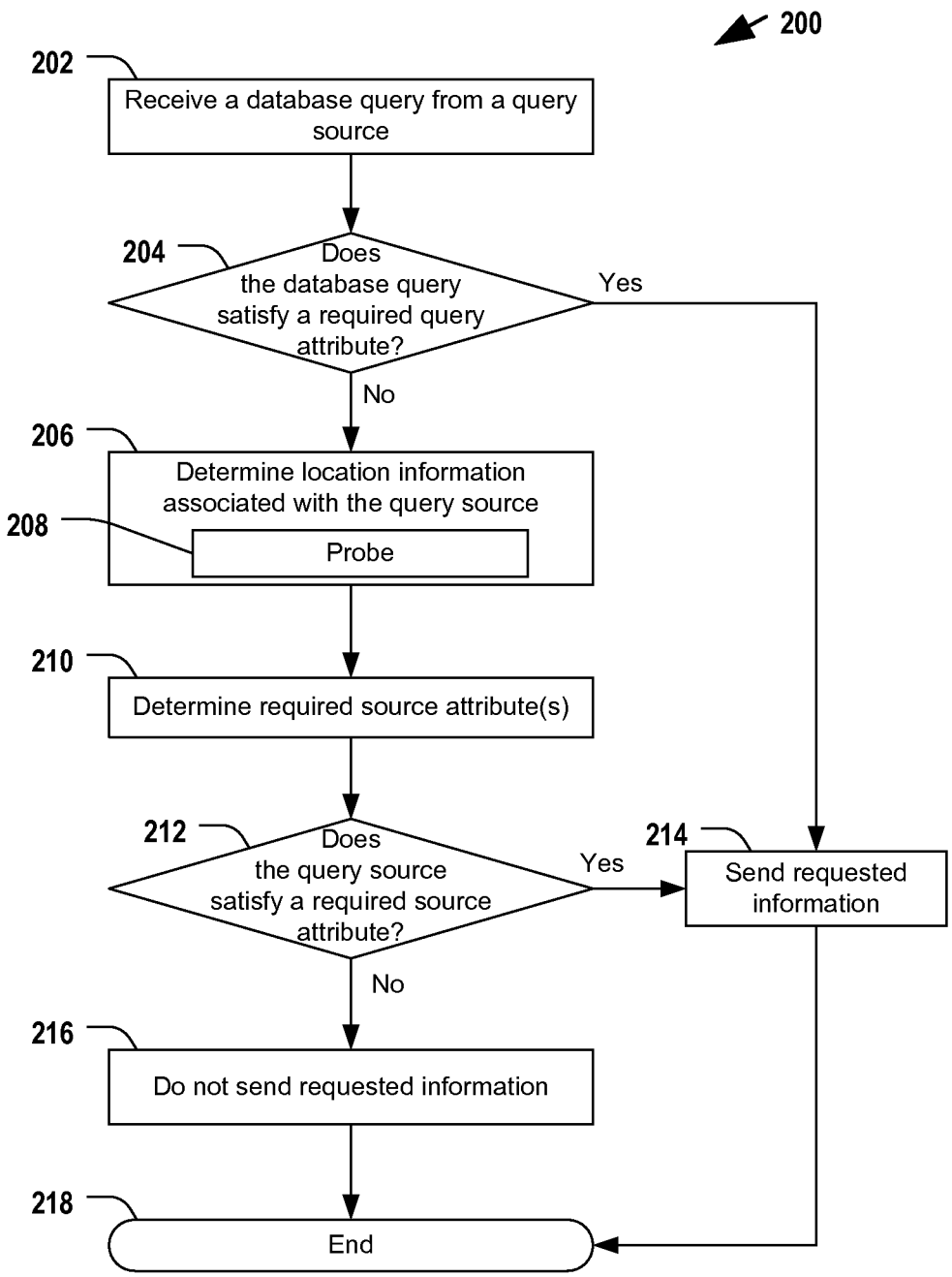
FIG. 2 is a flow diagram of a particular embodiment of a method of processing database queries.

Referring to FIG. 2, a particular embodiment of a method of processing database queries is illustrated and generally designated 200. At 202, a database search query is received from a query source. In an illustrative embodiment, the database search query can be received at a database interface system via a website. Moving to 204, the method 200 may include determining whether the database query satisfies a required query attribute. For example, the database interface system can determine whether the database query relates to information to which access may be restricted, such as information related to a particular geographic area. When the database query satisfies the required query attribute (e.g., the requested information is not related to a particular geographic area), the requested information may be sent, at 214.

When the database query does not satisfy the required attribute, the method 200 may include, at 206, determining location information associated with the query source. The location information associated with the query source may include geographic location information or network location information. For example, the geographic location information may include location information associated with the Internet Protocol (EP) address of the query source, location information associated with an Internet Service Provider (ISP) related to the IP address of the query source, location information associated with an administrative entity associated with the IP address of the query source, other geographic location information, or any combination thereof. Network location information may include physical location information or logical location information. Examples of physical network location information may include network physical topology information associated with the query source, network physical topology information associated with the ISP of the query source, network physical topology information associated with the administrative entity related to the query source, location information associated with a Domain Name System (DNS) server associated with the query source, other network topology information related to the query source, or any combination thereof. Examples of logical network location information may include network logical topology information associated with the query source, network logical topology information associated with the ISP of the query source, network logical topology information associated with the administrative entity related to the query source, other network logical topology information related to the query source, or any combination thereof. The physical location information, the logical location information, or both may be determined based on information derived from the database query, information stored at the database interface system, information determined, at 208, by probing the network (e.g., using probe commands), or any combination thereof.

Moving to 210, the method 200 can include determining one or more required source attributes based at least partially on one or more attributes of the database search query. In a particular embodiment, the required source attribute(s) can also be determined based partially on one or more criteria determination rules stored at the database interface system or at another system, such as a third-party system.

Proceeding to 212, the method 200 may include determining whether the query source satisfies the required source attribute(s) based on one or more attributes of the query source. If the query source satisfies the required source attribute(s), the method 200 continues to block 214, and sends the information requested by the database query. For example, the database interface system may retrieve the information from a data store coupled to or integrated with the database interface system. In another example, the database interface system may authorize another network element to retrieve the information, send the information, or both. Conversely, if the query source does not satisfy the required source attribute(s), the method 200 advances to 216 and does not send the requested information. For example, the database interface system may return no database information in response to the database search query, may return an unauthorized access error message, may not authorize another network element to retrieve of send the requested information, may add the query source to a list of blocked query sources, or any combination thereof. The method 200 terminates at 218.

Figure 3:
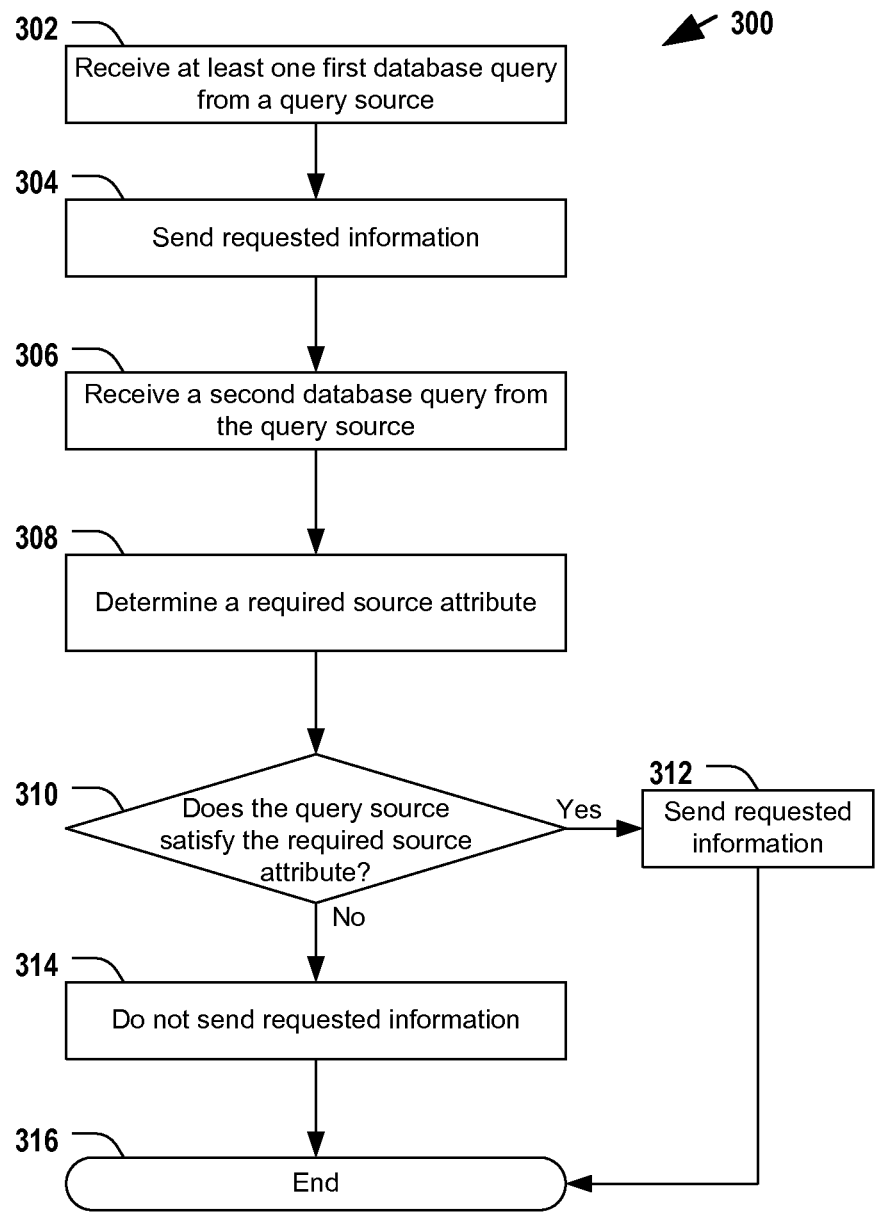
FIG. 3 is a flow diagram of a second particular embodiment of a method of processing database queries.

Referring to FIG. 3, a second particular embodiment of a method of processing database queries is illustrated and generally designated 300. At 302, at least one first database query is received from a query source. In an illustrative embodiment, the at least one first database query can be received at a database interface system. Moving to 304, the method 300 may include sending information requested by the at least one first database query. The method 300 may also include, at 306, receiving a second database query. In an illustrative embodiment, the at least one first database query and the second database query may be distinguished in that, the at least one first database query relates to generally accessible information and the second database query relates to protected information. For example, the at least one first database query may relate to information that is not related to a particular geographic area, whereas the second database query may relate to information related to a particular geographic area. In another illustrative embodiment, the at least one first database query and the second database query may be distinguished in that, the at least one first database query precedes the second database query. For example, the database interface system may be adapted to respond to a number of first database queries regardless of the information sought or the location of the query source. However, after a particular number of database queries are received from the same query source, the database interface system may determine whether the information sought is protected information, whether the database query satisfies certain criteria, whether the query source satisfies certain criteria, or any combination thereof. For example, a response may be sent a first database query from a first source without determining whether the database query, the query source, or both satisfy particular criteria. However, when the second database query is received from the source, the database interface system may determine whether the database query, the query source, or both satisfy particular criteria before responding to the database query.

At 308, the method 300 includes determining one or more required source attributes. The required source attributes may be determined based on attributes of the database query, attributes of the query source, or both. In a particular embodiment, the required query attribute(s) can also be determined based partially on one or more criteria determination rules.

Proceeding to 310, the method 300 includes determining whether one or more attributes of the query source satisfy the required source attribute(s). When the query source satisfies the required source attribute(s), the method 300 continues to 312, and sends the information requested by the database query. Conversely, when the query source does not satisfy the required source attribute(s), the method 300 advances to 314, and does not send the requested information. The method 300 terminates at 316.

Figure 4:
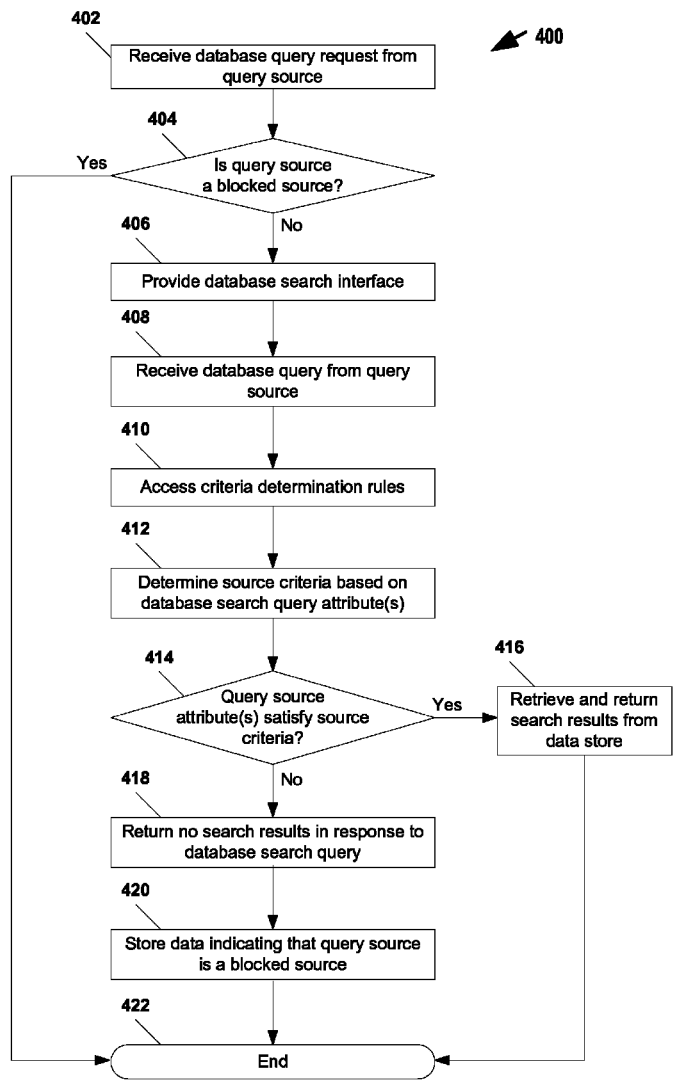
FIG. 4 is a flow diagram of a third particular embodiment of a method of processing database queries.

Referring to FIG. 4, a third particular embodiment of a method of processing database queries is illustrated and generally designated 400. The method 400 includes, at 402, receiving a database query request from a query source. For example, a database interface system can receive a selection of a search feature offered at a website, such as a selection of a link to a search page or an activation of a cursor within a search query box. At 404, the method 400 includes determining whether the query source is a blocked source, e.g., is on a list of sources not permitted to communicate with the database interface system. In an illustrative embodiment, the database interface system can identify an Internet Protocol (IP) address associated with the query source and can compare the IP address to data indicating IP addresses of blocked sources. When it is determined that the query source is a blocked source, the method 400 terminates at 422. On the other hand, when it is determined that the query source is not a blocked source, the method 400 continues to 406, and provides a database search interface to the query source via the website.

Proceeding to 408, a database query may be received from the query source. In a particular embodiment, the method 400 may include, at 410, accessing criteria determination rules and, at 412, determining one or more source criteria that the query source must satisfy based on the criteria determination rules. The source criteria may also be determined based on one or more attributes of the database search query, the query source, or both. The source criteria can include one or more primary criteria, one or more secondary criteria, one or more additional criteria, or any combination thereof.

At 414, the method 400 includes determining whether one or more attributes of the query source satisfy the source criteria. When the attribute(s) of the query source satisfy the source criteria, the method 400 continues to 416, retrieves database information, and returns the database information to the query source. For example, as search results provided for display on a web page. Conversely, when the attribute(s) of the query source do not satisfy the required source criteria, the method 400 advances to 418, and returns no database information in response to the database search query. Further, the method 400 includes, at 420, storing data indicating that the query source is a blocked source. The method 400 terminates at 422.

Figure 5:
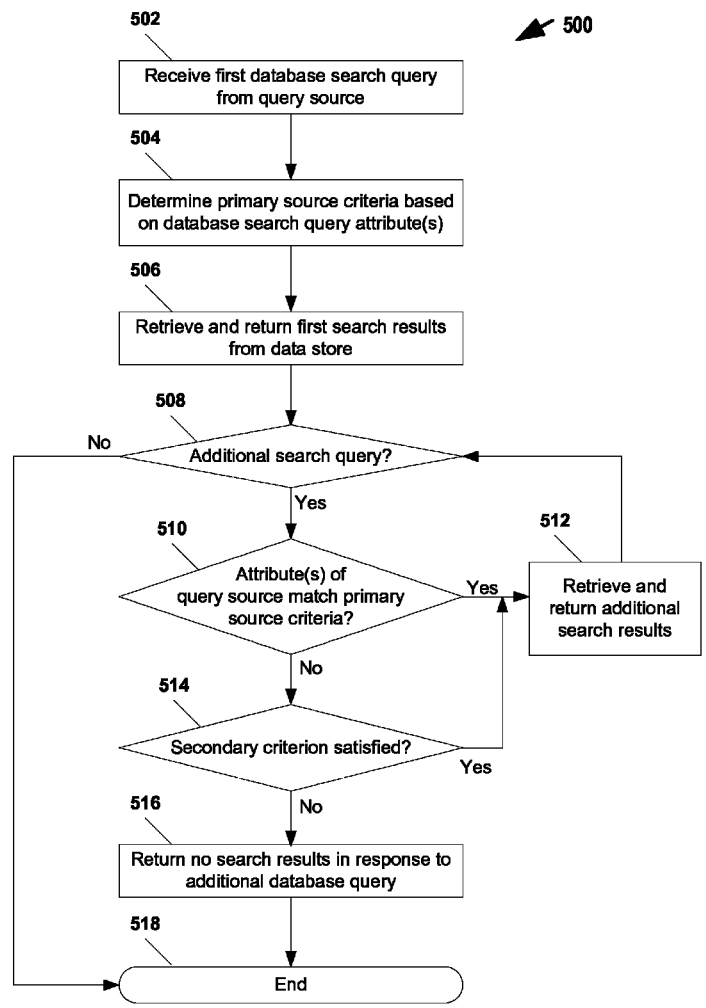
FIG. 5 is a flow diagram of a fourth particular embodiment of a method of processing database queries.

Referring to FIG. 5, a fourth particular embodiment of a method of processing database queries is illustrated and generally designated 500. The method 500 includes, at 502, receiving a first database search query from a query source. In an illustrative embodiment the first database search query can be received at a database interface system via a website. Moving to 504, the method 500 includes determining one or more primary source criteria based at least partially on one or more attributes of the database search query. Continuing to 506, the method 500 includes retrieving and returning first search results related to the database search query to the query source via the website.

In a particular embodiment the method 500 includes, at 508, determining whether an additional search query has been received from the query source. When an additional search query has not been received from the query source, the method 500 terminates at 518. When an additional search query has been received from the query source, the method 500 advances to 510, and determines whether one or more attributes of the query source satisfy the source criteria. When the query source satisfies the primary source criteria, the method 500 continues to 512, and retrieves and returns additional search results. In a particular embodiment, the method 500 may return to 508 to determine whether additional search queries are received from the query source.

Returning to 510, when the query source does not satisfy the primary source criteria, the method 500 includes, at 514, determining whether secondary criteria are satisfied. The secondary criteria may include, for example, a daily maximum number of searches associated with the query source. When the secondary criteria are satisfied, the method 500 includes, at 512, retrieving and returning additional search results. Conversely, when the secondary criteria are not satisfied, the method 500 includes, at 516, returning no search results in response to the additional database query. The method 500 terminates at 518.

Figure 6:
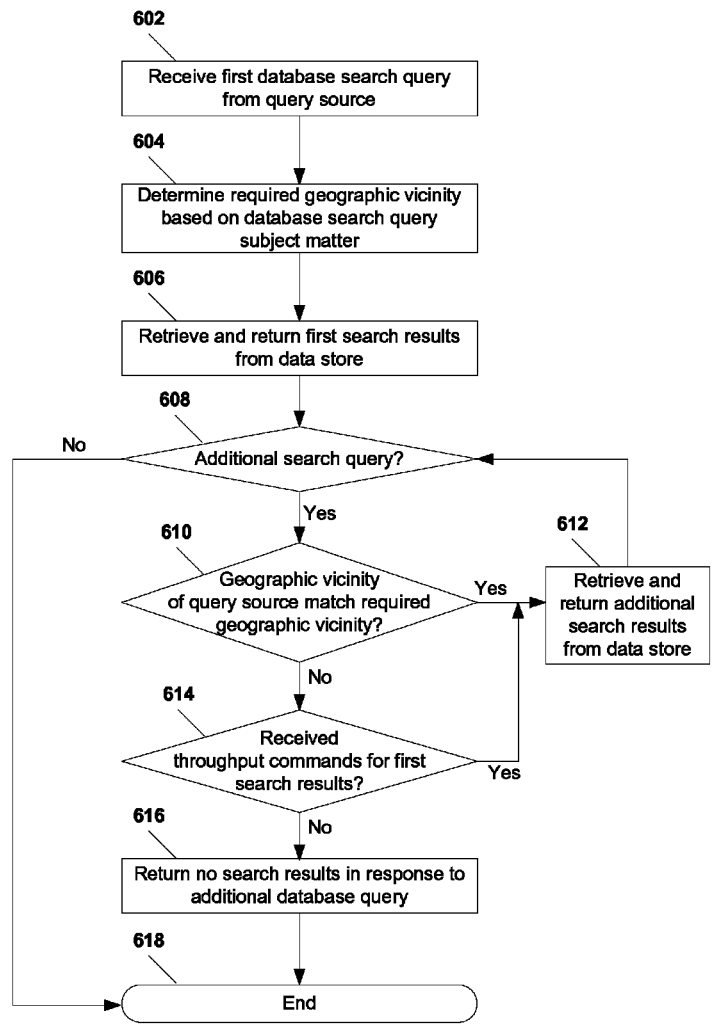
FIG. 6 is a flow diagram of a fifth particular embodiment of a method of processing database queries.

Referring to FIG. 6, a fifth particular embodiment of a method of processing database queries is illustrated and generally designated 600. The method 600 includes, at 602, receiving a first database search query from a query source. For example, the database search query may be received at a database interface system. At 604, the method 600 includes determining a required geographic vicinity based on the subject matter of the database search query. Continuing to 606, the method 600 includes retrieving and returning first search results from a data store.

The method 600 also includes, at 608, determining whether an additional search query has been received from the query source. When no additional search query has been received from the query source, the method 600 terminates at 618. Whereas, when an additional search query has been received from the query source, the method 600 includes, at 610, determining whether the geographic vicinity of the query source satisfies the required geographic vicinity. When the geographic vicinity of the query source satisfies the required geographic vicinity, the method continues to 612, and retrieves and returns additional search results from the data store. In a particular embodiment, the method may return to 608 to determine whether additional search queries are received from the query source.

Returning to 610, when the geographic vicinity of the query source does not satisfy the required geographic vicinity, the method 600 includes, at 614, determining whether a threshold number of throughput commands was received with respect to the first search results. When the threshold number of throughput commands was received with respect to the first search results, the method 600 proceeds to 612, and retrieves and returns additional search results even though the geographic vicinity of the query source does not satisfy the required geographic vicinity. Conversely, when the threshold number of throughput commands was not received with respect to the first search results, the method 600 proceeds to 616 and no search results are returned in response to the database search query. The method 600 terminates at 618.

In conjunction with the configuration of structure described herein, the systems and methods disclosed provide processing of database queries. In a particular embodiment, a database interface system receives a database query from a query source. The database interface system determines a required source attribute based on the database query. The database interface system also determines whether the query source satisfies the required source attribute based on one or more attributes associated with the query source. If the required source attribute is not satisfied, the information requested by the database query is not returned to the query source.

In particular embodiments, by restricting access to all or part of the data in a database based on attributes associated with database queries, query sources, or both, botnets may be prevented from copying or otherwise compromising the database. Such embodiments may be especially useful to protect all or part of the data of an open database query service (i.e., a database service that does not require a user identification or password), such as a yellow pages or white pages database. The attributes associated with database query or query source may be attributes that are difficult or impossible for the controller of a botnet to change or spoof. For example, the attributes may not be controlled directly by the query source. Thus, when a particular computer in the botnet is used as the query source, the attribute may not be controlled via the botnet.

Figure 7:
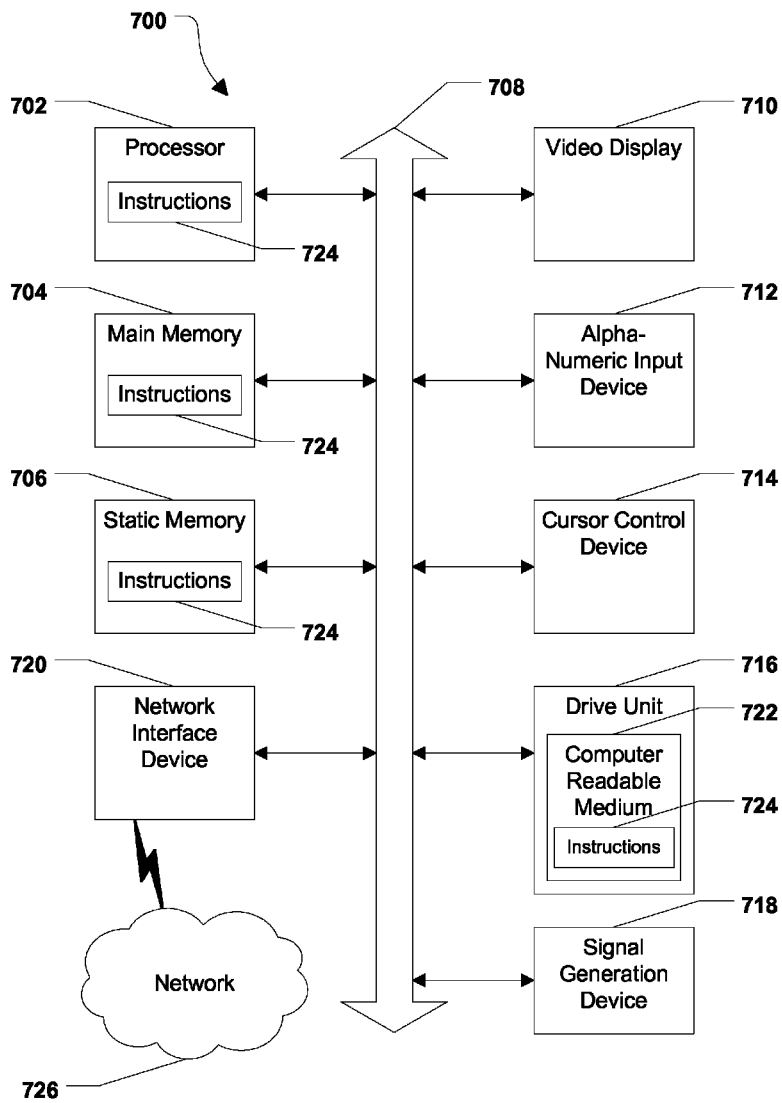
FIG. 7 is a diagram of an illustrative embodiment of a general computer system.

Referring to FIG. 7, an illustrative embodiment of a general computer system is shown and is designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices. For example, the computing system 700 may include or be included within any one or more of the database interface system, data store, botnet computers, or user computers illustrated in FIG. 1.

The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710, such as a liquid crystal display (LCD), an organic light emitting diode (OLED), a flat panel display, a solid state display, or a cathode ray tube (CRT). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720.

In a particular embodiment, as depicted in FIG. 7, the disk drive unit 716 may include a computer-readable medium 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 724 or receives and executes instructions 724 responsive to a propagated signal, so that a device connected to a network 726 can communicate voice, video or data over the network 726. Further, the instructions 724 may be transmitted or received over the network 726 via the network interface device 720.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments which fall within the true spirit and scope of the present invention. Thus, to the maximum extent trusted by law, the scope of the present invention is to be determined by the broadest permissible interpretation of the following claims and their equivalents, and shall not be restricted or limited by the foregoing detailed description.

What is claimed is:

1. A method of processing database queries, the method comprising:
    receiving a database query from a query source that requests information from a business search website, wherein the database query requests geographical location specific data, and wherein the geographical location specific data includes contact information associated with a business;
    determining a first number of database queries received from the query source during a time period;
    determining location information associated with the query source based on an internet protocol address associated with the database query and based on information controlled at a domain name service router independent from the query source;
    determining, based on the location information, whether the query source is within a designated geographical vicinity of a geographical location associated with the geographical location specific data;
    when the query source is within the designated geographical vicinity of the geographical location and the first number fails to satisfy a first threshold, preventing access to the geographical location specific data; and
    when the query source is not within the designated geographical vicinity of the geographical location, preventing access to the geographical location specific data when the first number fails to satisfy a second threshold, wherein the second threshold is smaller than the first threshold.

2. The method of claim 1, wherein the location information associated with the query source is related to a physical location within a network topology.

3. The method of claim 1, wherein the location information associated with the query source is related to a logical location within a network topology.

4. The method of claim 1, wherein the query source is within the designated geographical vicinity of the geographical location when the location information indicates that the query source is within a designated distance from the geographical location.

5. The method of claim 1, further comprising allowing access to the geographical location specific data when the first number satisfies the second threshold and the query source is not within the designated geographical vicinity of the geographical location.

6. The method of claim 1, further comprising preventing access to the geographical location specific data when a second number of consecutive database queries that request information in alphabetical order do not satisfy a third threshold.

7. The method of claim 1, wherein the time period is a twenty four hour period.

8. A method of processing database queries, the method comprising:
    receiving a database query from a query source that requests information from a business search website, wherein the database query requests geographical location specific data, and wherein the geographical location specific data includes contact information associated with a business;
    determining a first number of database queries received from the query source during a time period;
    determining location information associated with the query source based on an internet protocol address associated with the database query and based on information controlled at a first network element independent from the query source;
    determining whether the query source is within a designated geographical vicinity of a geographical location associated with the geographical location specific data based on the location information associated with the query source;
    when the query source is within the designated geographical vicinity of the geographical location and the first number satisfies a first threshold, allowing access to the geographical location specific data; and
    when the query source is not within the designated geographical vicinity of the geographical location, preventing access to the geographical location specific data when a threshold number of click-through commands are not received with respect to prior search results provided to the query source during the time period.

9. The method of claim 8, wherein preventing access to the geographical location specific data includes not authorizing a second network element to send the geographical location specific data to the query source.

10. The method of claim 8, wherein the geographical location specific data includes contact information associated with a second business in addition to the business.

11. The method of claim 8, wherein the contact information includes a location, an address, a telephone number, or a combination thereof.

12. A processor-readable memory including instructions executable by a processor to perform operations comprising:
    receiving a database query from a query source, that requests information from a business search website, wherein the database query requests geographical location specific data, and wherein the geographical location specific data includes contact information associated with a business;

determining a first number of database queries received from the query source during a time period;

determining location information associated with the query source based on an internet protocol address associated with the database query and based on information controlled at an internet service provider server independent from the query source;

determining, based at least partially on the location information, whether the query source is within a designated geographical vicinity of a geographical location associated with the geographical location specific data;

when the query source is within the designated geographical vicinity of the geographical location and the first number satisfies a first threshold, allowing access to the geographical location specific data; and when the query source is not within the designated geographical vicinity of the geographical location, preventing access to the geographical location specific data when the first number does not satisfy a second threshold, wherein the second threshold is smaller than the first threshold.

13. The processor-readable memory of claim 12, wherein the query source is within the designated geographical vicinity of the geographical location when the location information indicates that the query source is within the same state as the geographical location.

14. The processor-readable memory of claim 12, wherein the query source is within the designated geographical vicinity of the geographical location when the location information indicates that the query source is at a required latitude and longitude.

15. The processor-readable memory of claim 12, wherein the query source is within the designated geographical vicinity of the geographical location when the location information indicates that the query source is within a required range of latitudes and longitudes.

16. The processor-readable memory of claim 12, wherein the query source is within the designated geographical vicinity of the geographical location when the location information indicates that the query source is within a particular time zone.

* * * * *